United States Patent
Hirooka

(10) Patent No.: US 10,895,187 B2
(45) Date of Patent: Jan. 19, 2021

(54) EXHAUST GAS PURIFICATION APPARATUS FOR INTERNAL COMBUSTION ENGINE

(71) Applicant: TOYOTA JIDOSHA KABUSHIKI KAISHA, Toyota (JP)

(72) Inventor: Shigemasa Hirooka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/656,695

(22) Filed: Oct. 18, 2019

(65) Prior Publication Data

US 2020/0131962 A1   Apr. 30, 2020

(30) Foreign Application Priority Data

Oct. 26, 2018 (JP) ................... 2018-201974

(51) Int. Cl.
*F01N 3/20* (2006.01)
*F01N 9/00* (2006.01)
*F01N 11/00* (2006.01)

(52) U.S. Cl.
CPC ......... *F01N 3/2013* (2013.01); *F01N 3/2026* (2013.01); *F01N 9/00* (2013.01); *F01N 11/00* (2013.01); *F01N 2240/16* (2013.01); *F01N 2260/10* (2013.01); *F01N 2570/22* (2013.01); *F01N 2590/11* (2013.01); *F01N 2900/0422* (2013.01); *F01N 2900/0602* (2013.01);
(Continued)

(58) Field of Classification Search
CPC ........ F01N 3/2013; F01N 3/2026; F01N 9/00; F01N 11/00; F01N 2240/16; F01N 2260/10; F01N 2570/22; F01N 2590/11; F01N 2900/0422; F01N 2900/0602; F01N 2900/1628; F01N 2900/1631
See application file for complete search history.

(56) References Cited

U.S. PATENT DOCUMENTS 8,091,663 B2 * 1/2012 Ichikawa ............... B60L 50/61
                                                180/65.265
2011/0265460 A1 * 11/2011 Hirai ..................... F01N 13/009
                                                60/286
(Continued)

FOREIGN PATENT DOCUMENTS

JP      2012-107567 A    6/2012

*Primary Examiner* — Audrey K Bradley
(74) *Attorney, Agent, or Firm* — Oliff PLC

(57) ABSTRACT

An exhaust gas purification apparatus for an internal combustion engine according to the present disclosure obtains an electric resistance value of the electrically heated catalyst after the lapse of a predetermined period of time which is a period of time required for condensed water adhered to the electrically heated catalyst to finish evaporating from the start of energization of the electrically heated catalyst, and calculates a heat energy shortage amount which is an amount of heat energy insufficient for raising the temperature of the electrically heated catalyst to a predetermined temperature or above, based on a difference between the electric resistance value thus obtained and a predetermined reference resistance value. Then, the exhaust gas purification apparatus supplies to the electrically heated catalyst an amount of energy required to compensate for the heat energy shortage amount.

18 Claims, 9 Drawing Sheets

(52) U.S. Cl.
CPC ................ *F01N 2900/1628* (2013.01); *F01N 2900/1631* (2013.01)

(56) References Cited

U.S. PATENT DOCUMENTS

2014/0292350 A1* 10/2014 Yoshioka .............. F01N 3/2853
　　　　　　　　　　　　　　　　　　　　　　324/551
2015/0007551 A1* 1/2015 Tanaka .................... F01N 11/00
　　　　　　　　　　　　　　　　　　　　　　60/274
2018/0087427 A1* 3/2018 Korenaga ............. F01N 3/2026

* cited by examiner

[Fig. 1]
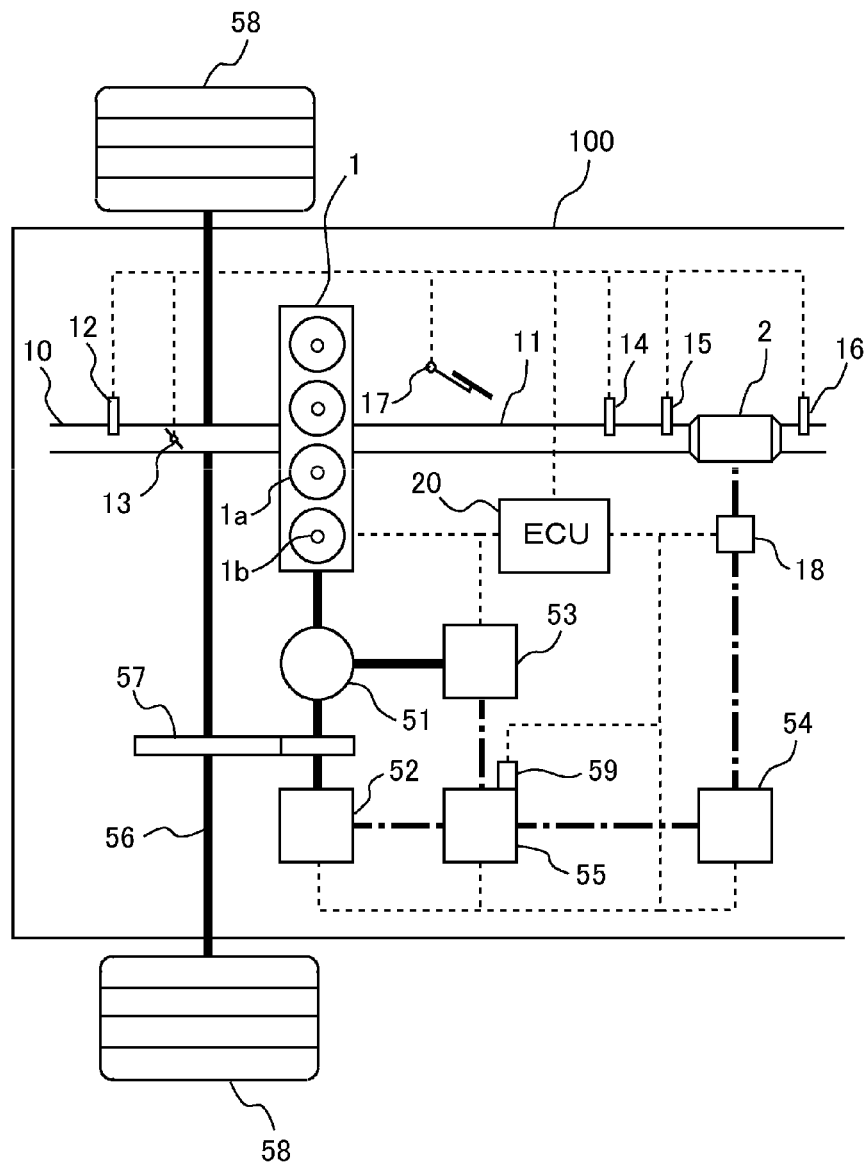

[Fig. 2]
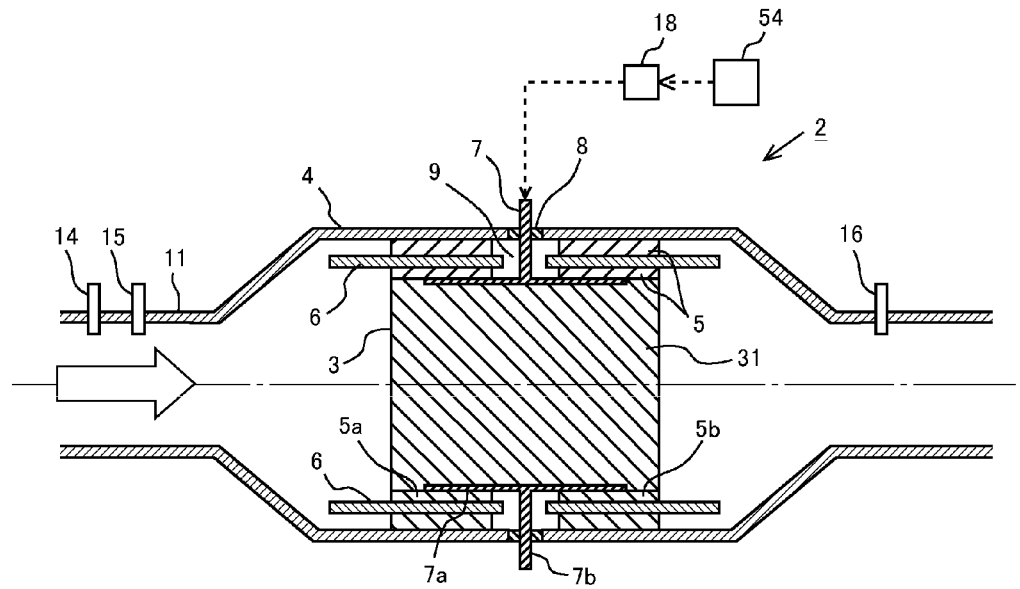
[Fig. 3]
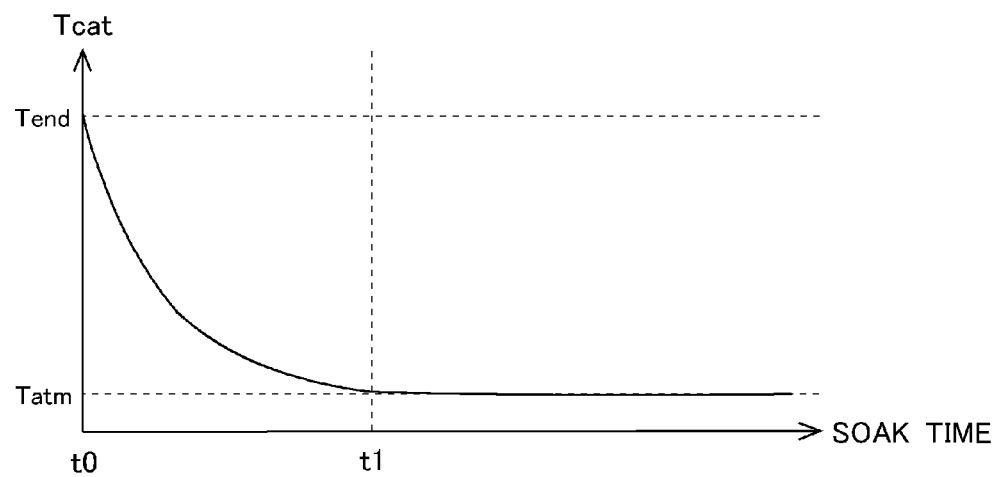

[Fig. 4]
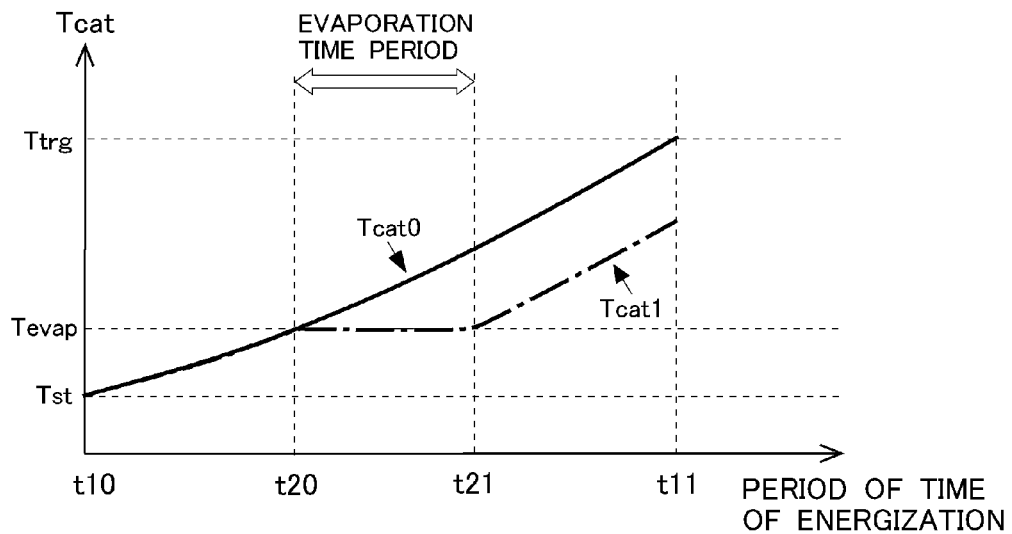
[Fig. 5]
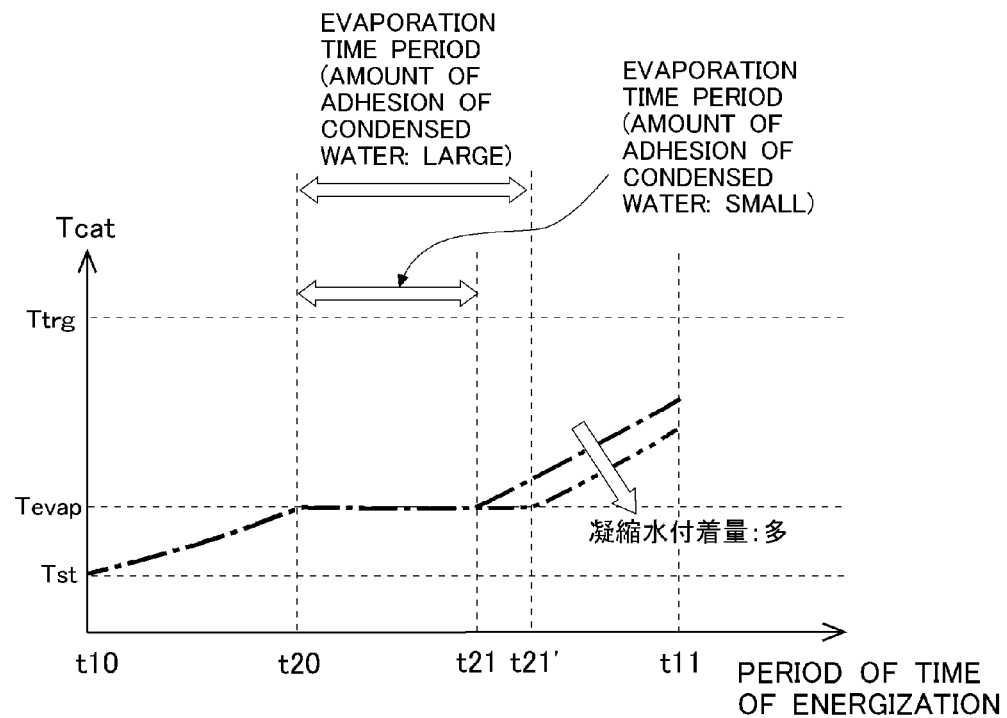

[Fig. 6]
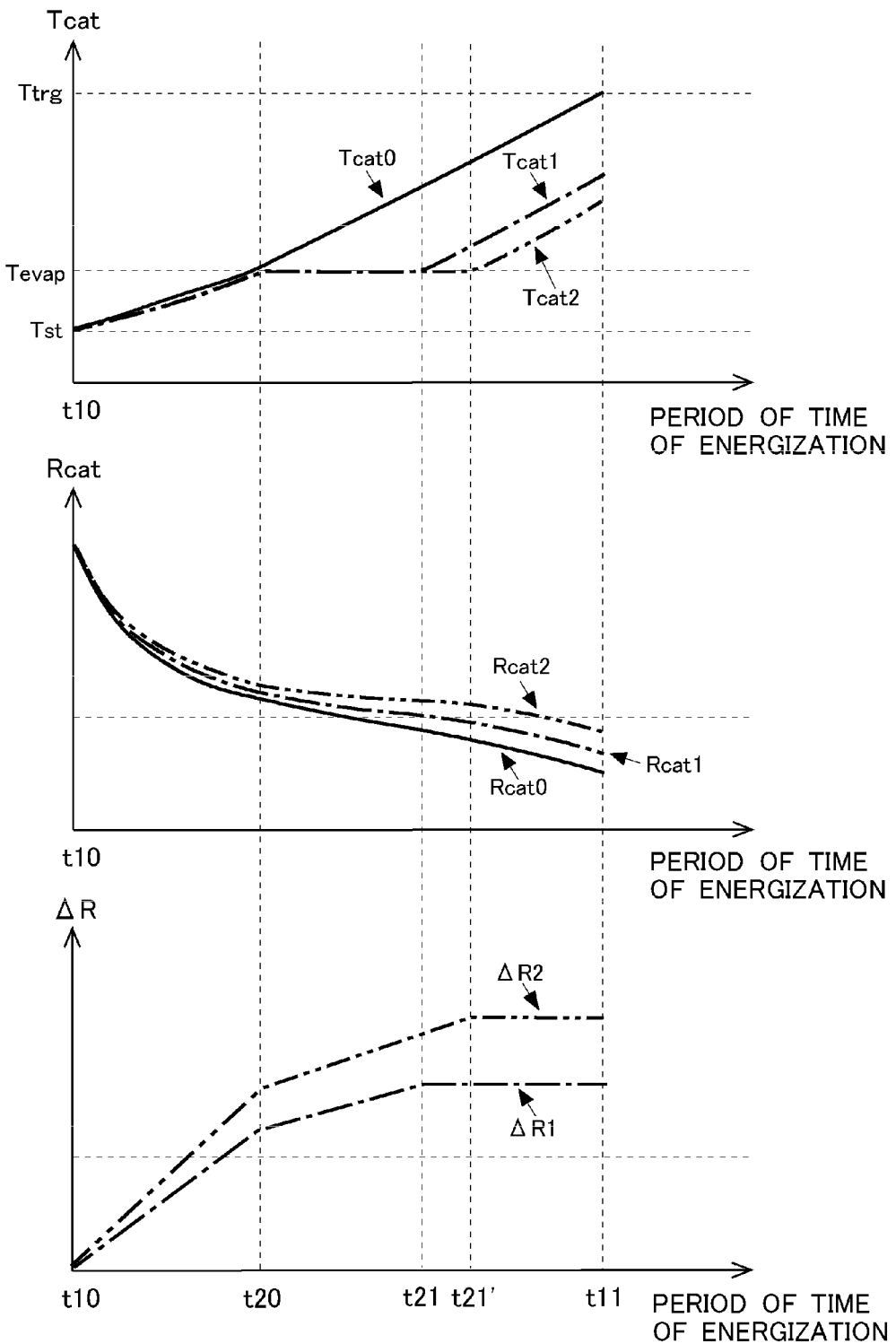

[Fig. 7]
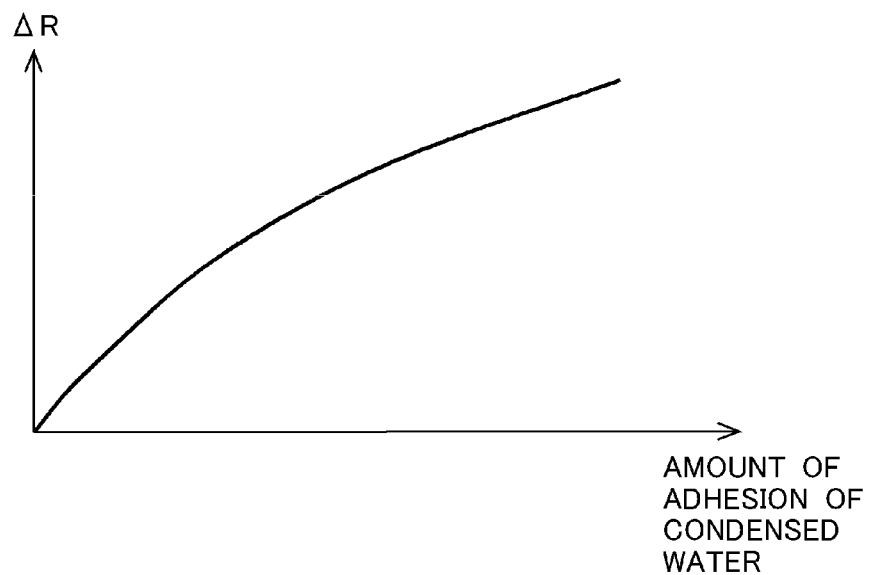
[Fig. 8]
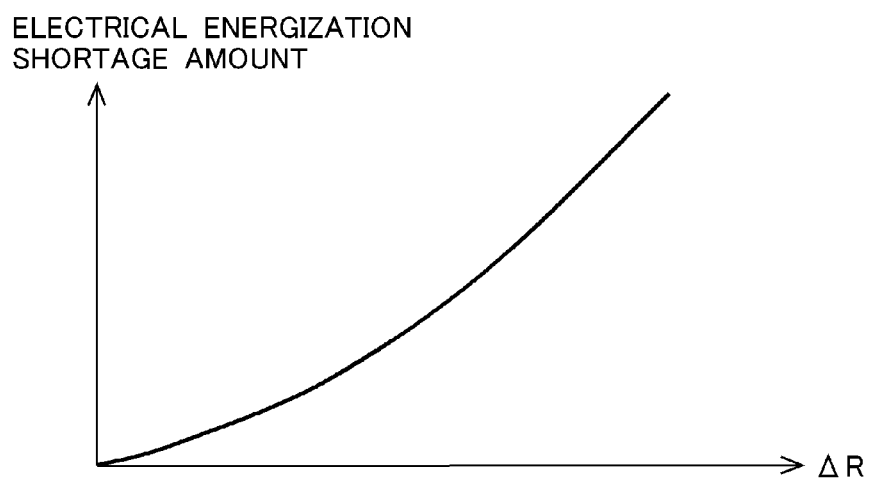

[Fig. 9]
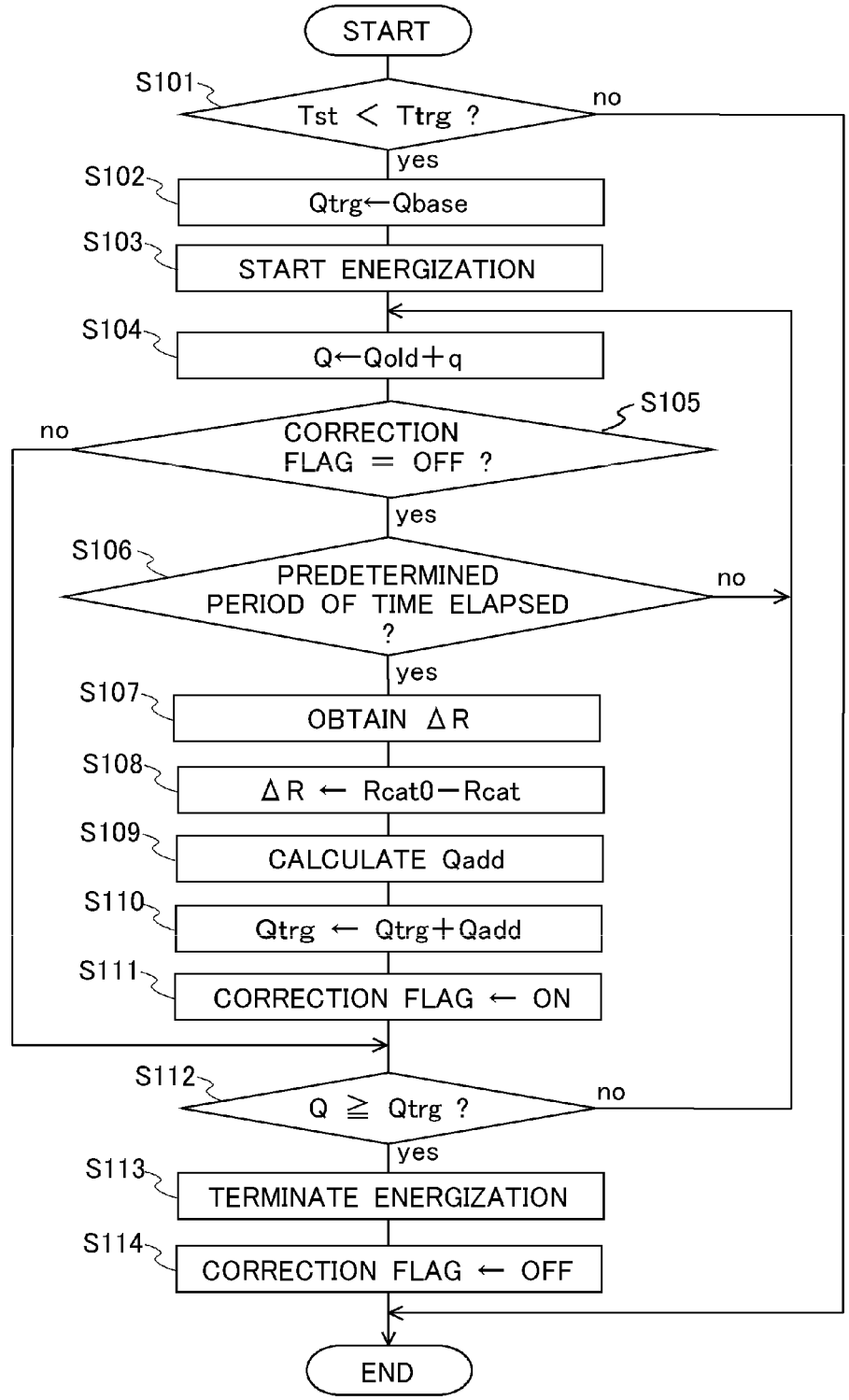

[Fig. 10]
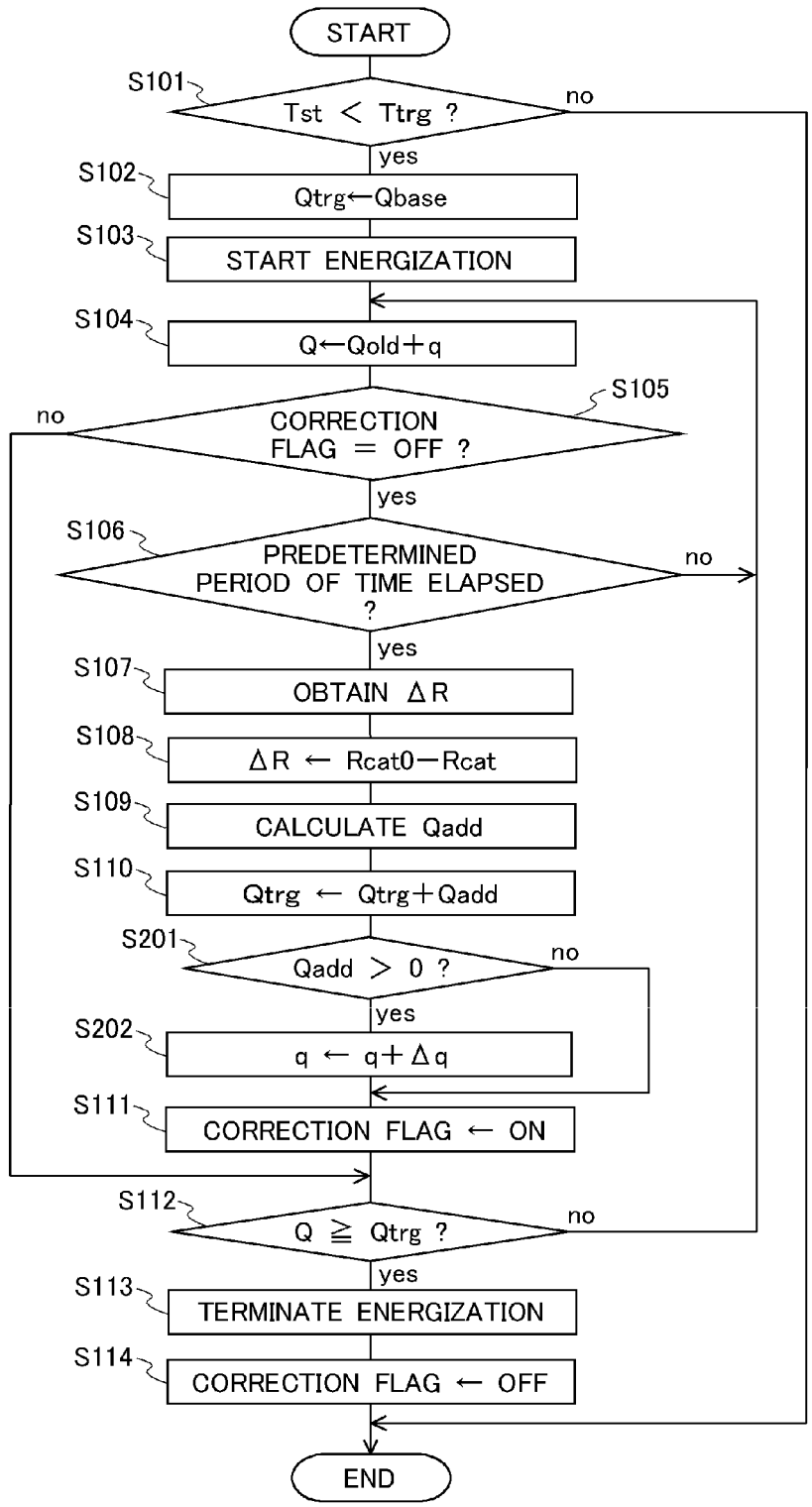

[Fig. 11]
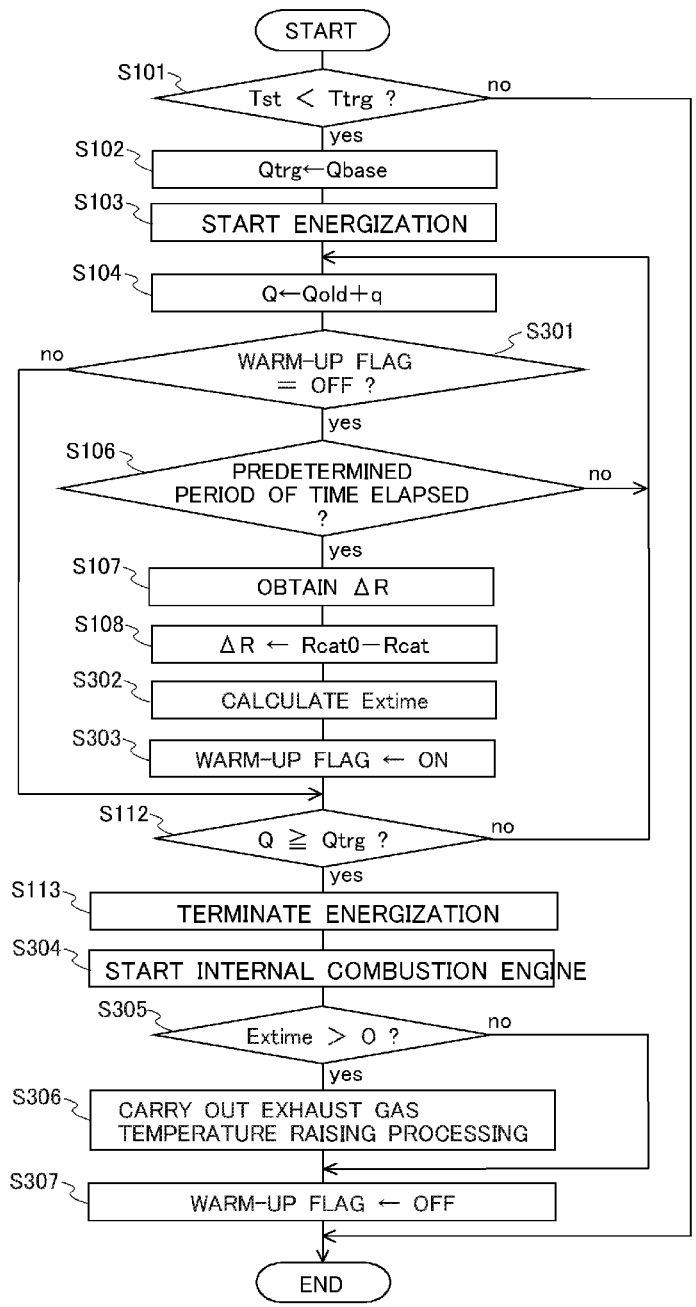

[Fig. 12]
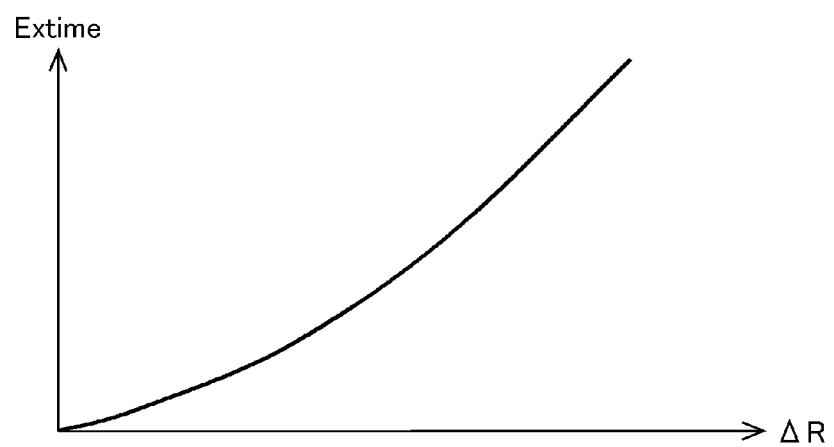

//EXHAUST GAS PURIFICATION APPARATUS FOR INTERNAL COMBUSTION ENGINE

CROSS-REFERENCE TO RELATED APPLICATIONS

This application claims the benefit of Japanese Patent Application No. 2018-201974, filed on Oct. 26, 2018 which is hereby incorporated by reference herein in its entirety.

BACKGROUND

Technical Field

The present disclosure relates to an exhaust gas purification apparatus for an internal combustion engine.

Description of the Related Art

As an exhaust gas purification apparatus for an internal combustion engine, there has been known one which is provided with an exhaust gas purification catalyst (hereinafter sometimes referred to as an "electrically heated catalyst") along with a heat generating element which is electrically energized to generate heat. According to such an exhaust gas purification apparatus for an internal combustion engine, it becomes possible to suppress exhaust emission at the time of, and immediately after, starting of the internal combustion engine as small as possible, by electrically energizing the electrically heated catalyst in advance of the starting of the internal combustion engine.

However, when condensed water has adhered to the above-mentioned electrically heated catalyst, a part of the heat energy generated by electrical energization of the electrically heated catalyst will be consumed by evaporation of the condensed water, so the temperature rise of the electrically heated catalyst will be hindered. On the other hand, there has been proposed a technique in which an amount of the condensed water adhered to the electrically heated catalyst is estimated based on the operating time of the internal combustion engine at the time of the last operation thereof, the temperature history of the electrically heated catalyst, etc., thereby correcting the amount of energization of the electrically heated catalyst according to the amount of adhesion of the condensed water thus estimated (for example, refer to patent literature 1).

CITATION LIST

Patent Literature

Patent Literature 1: Japanese patent application laid-open publication No. 2012-107567

SUMMARY

However, when the period of stop of the operation of the internal combustion engine becomes long, or when the temperature of outside air during the stop of the operation of the internal combustion engine becomes high, some or all of the condensed water adhered to the electrically heated catalyst may evaporate. In that case, an actual amount of adhesion of the condensed water becomes smaller than an estimated value thereof, so the amount of energization of the electrically heated catalyst may increase to an excessive extent, and accordingly, energy for obtaining heat to be supplied to the exhaust gas purification catalyst may also increase to an excessive extent.

The present disclosure has been made in view of the actual circumstances as referred to above, and has for its object to provide a technique that can suppress an excess or deficiency of heat energy supplied to an electrically heated catalyst when raising the temperature of the electrically heated catalyst.

According to the present disclosure, in order to solve the above-mentioned problems, an electric resistance value of an electrically heated catalyst after the lapse of a predetermined period of time from the start of energization of the electrically heated catalyst is obtained, and an amount of energy supplied to the electrically heated catalyst is adjusted based on a difference (resistance difference) between the electric resistance value thus obtained and a predetermined reference resistance value.

Specifically, the present disclosure is configured to include: an electrically heated catalyst arranged in an exhaust passage of an internal combustion engine, and including a heat generation element that generates heat by being energized and an exhaust gas purification catalyst; and a controller including at least one processor. The processor is configured to start electrical energization of the electrically heated catalyst before starting of the internal combustion engine; obtain an electric resistance value of the electrically heated catalyst after the lapse of a predetermined period of time which is a period of time required for condensed water adhered to the electrically heated catalyst to finish evaporating from the start of energization of the electrically heated catalyst; calculate a heat energy shortage amount which is an amount of heat energy insufficient for raising the temperature of the electrically heated catalyst to a predetermined temperature or above, based on a resistance difference which is a difference between the electric resistance value and a predetermined reference resistance value; and supply to the electrically heated catalyst an amount of energy required to compensate for the heat energy shortage amount. Here, note that the "predetermined reference resistance value" referred to herein corresponds to an electric resistance value of the electrically heated catalyst in the case of electrically energizing the electrically heated catalyst in a state where condensed water has not adhered thereto.

With the exhaust gas purification apparatus for an internal combustion engine configured in this manner, in cases where the temperature of the electrically heated catalyst is low, the controller electrically energizes the electrically heated catalyst in advance of the starting of the internal combustion engine, thereby preheating the electrically heated catalyst. Here, note that a total amount of electric power (i.e., an amount of energization) supplied to the electrically heated catalyst at that time is generally set based on an estimated temperature of the electrically heated catalyst at the time of the start of energization, etc. (hereinafter, the amount of energization decided in this manner may sometimes be referred to as a "reference energization amount").

However, when condensed water has adhered to the electrically heated catalyst at the time of the start of energization thereof, a part of the heat energy generated by the energization of the electrically heated catalyst will be consumed by evaporation of the condensed water. For that reason, a temperature capable of being reached by the electrically heated catalyst due to the electric power of the reference amount of energization being supplied to the electrically heated catalyst becomes lower in the case where condensed water has adhered to the electrically heated catalyst than in the case where it has not adhered. Moreover, the amount of heat energy consumed by the evaporation of the condensed water becomes larger in the case where the amount of the condensed water adhered to the electrically heated catalyst (the amount of adhesion of the condensed water) at the point in time of the start of energization (i.e., at the energization start time point) is large than in the case where it is small. Accordingly, when condensed water has adhered to the electrically heated catalyst at the energization start time point, there is a possibility that it becomes difficult to raise the temperature of the electrically heated catalyst in an effective manner, even if the electric power of the reference energization amount is supplied to the electrically heated catalyst.

In contrast to this, as a result of keen and earnest experiments and verification carried out by the inventor of the subject application, knowledge has been obtained that the resistance difference after the lapse of the predetermined period of time from the start of the energization of the electrically heated catalyst is in correlation with the amount of adhesion of the condensed water. Accordingly, in the exhaust gas purification apparatus for an internal combustion engine according to the present disclosure, the controller obtains the electric resistance value of the electrically heated catalyst after the lapse of the predetermined period of time from the start of the energization to the electrically heated catalyst by the controller. Then, the controller calculates the heat energy shortage amount, which is the amount of heat energy insufficient for raising the temperature of the electrically heated catalyst to the predetermined temperature or above, based on the resistance difference which is the difference between the electric resistance value obtained by the controller and the predetermined reference resistance value. Here, the resistance difference after the lapse of the predetermined period of time from the start of the energization becomes larger in the case where the amount of adhesion of the condensed water is large than in the case where it is small. Accordingly, the controller should just estimate the heat energy shortage amount to be larger in the case where the resistance difference is large in comparison with the case where it is small. Then, the controller supplies to the electrically heated catalyst the amount of energy required to compensate for the heat energy shortage amount calculated by the controller. As a result of this, it becomes possible to supply the heat energy required for raising the temperature of the electrically heated catalyst to the predetermined temperature or above to the electrically heated catalyst without excess and deficiency.

In addition, the predetermined period of time in the present disclosure may be a period of time required for all the condensed water adhered to the electrically heated catalyst to finish evaporating from the start of the energization of the electrically heated catalyst in a state where a maximum amount of condensed water capable of adhering to the electrically heated catalyst has adhered to the electrically heated catalyst. Here, note that the maximum amount of condensed water capable of adhering to the exhaust gas purification catalyst corresponds to an amount of adhesion of the condensed water at the time when the internal combustion engine is used under the condition in which the amount of adhesion of the condensed water becomes the largest. In cases where the predetermined period of time is decided in the above-mentioned manner, the electrically heated catalyst after the lapse of the predetermined period of time from the start of the energization of the electrically heated catalyst will be in a state where the condensed water adhered to the electrically heated catalyst at the energization start time point has finished evaporating. For that reason, the controller can obtain the electric resistance value of the electrically heated catalyst in the state where the condensed water has finished evaporating. With this, it becomes possible to obtain a high resistance difference having a high correlation with the amount of adhesion of the condensed water, so it also becomes possible to calculate the heat energy shortage amount with improved accuracy.

Moreover, the predetermined period of time in the present disclosure may be a period of time from the start of the energization of the electrically heated catalyst until an amount of change per unit time of the resistance difference becomes equal to or less than a predetermined threshold value. Here, in the case where the condensed water has adhered to the electrically heated catalyst at the energization start time point, in a period of time from the start of the energization of the electrically heated catalyst until the condensed water adhered to the electrically heated catalyst finishes evaporating, an amount of change per unit time of the electric resistance value is different from an amount of change per unit time of the predetermined reference resistance value (i.e., the resistance difference does not become constant), but after the condensed water adhered to the electrically heated catalyst has finished evaporating, the amount of change per unit time of the electric resistance value becomes substantially equal to the amount of change per unit time of the predetermined reference resistance value (i.e., the resistance difference becomes substantially constant). For that reason, when the amount of change per unit time of the resistance difference becomes equal to or less than the predetermined threshold value after the start of the energization of the electrically heated catalyst, it can be assumed that the condensed water adhered to the electrically heated catalyst has finished evaporating. Here, note that the "predetermined threshold value" referred to herein is a small value to such an extent that the resistance difference can be assumed to be substantially constant (i.e., the amount of change per unit time of the resistance difference can be assumed to be substantially zero). Accordingly, when the period of time from the start of the energization of the electrically heated catalyst until the amount of change per unit time of the resistance difference becomes equal to or less than the predetermined threshold value is set to the predetermined period of time, the controller can obtain the electric resistance value of the electrically heated catalyst in the state where the condensed water has finished evaporating. As a result of this, it becomes possible to obtain a high resistance difference having a high correlation with the amount of adhesion of the condensed water, so it also becomes possible to calculate the heat energy shortage amount with improved accuracy.

Here, as the amount of energy required to compensate for the heat energy shortage amount, there may be used an amount of electrical energy (an electrical energization shortage amount) required for the electrically heated catalyst to generate heat energy of the heat energy shortage amount. That is, the controller may add the electrical energization shortage amount to the amount of energization of the electrically heated catalyst. In that case, the controller may add the electrical energization shortage amount to the amount of energization of the electrically heated catalyst, by making longer the period of time of energization of the electrically heated catalyst, without changing the amount of energization per unit time of the electrically heated catalyst. Here, note that, from the point of view of making short the time required for warming up the electrically heated catalyst, the controller may add the electrical energization shortage amount to the amount of energization of the electrically heated catalyst, by making larger the amount of electrical energization per unit time of the electrically heated catalyst.

As another method of supplying the heat energy of the heat energy shortage amount to the electrically heated catalyst, there can also be used a method of carrying out exhaust gas temperature raising processing, which is processing to raise the temperature of exhaust gas discharged from the internal combustion engine after the starting of the internal combustion engine. The "exhaust gas temperature raising processing" referred to herein is, for example, processing to retard ignition timing in a spark ignition internal combustion engine, or processing to retard fuel injection timing in a compression ignition internal combustion engine, or processing to carry out post injection in a compression ignition internal combustion engine, etc. When the exhaust gas temperature raising processing is carried out after the starting of the internal combustion engine, the heat energy possessed by the exhaust gas discharged from the internal combustion engine will increase. As a result of this, the heat energy supplied from the exhaust gas to the electrically heated catalyst increases, so that the heat energy of the heat energy shortage amount can be supplied to the electrically heated catalyst.

Further, in the exhaust gas purification apparatus for an internal combustion engine according to the present disclosure, in cases where a request for starting the internal combustion engine occurs in the middle of adding the electrical energization shortage amount to the amount of energization of the electrically heated catalyst, the controller may stop the electrical energization to the electrically heated catalyst, and at the same time, may carry out the exhaust gas temperature raising processing. According to this, even in cases where the internal combustion engine is started in the course of the electrical energization shortage amount being added to the amount of energization of the electrically heated catalyst, the amount of energy required to compensate for the heat energy shortage amount can be supplied to the electrically heated catalyst.

According to the present disclosure, it is possible to suppress an excess or deficiency of heat energy supplied to an electrically heated catalyst, when the temperature of the electrically heated catalyst is raised.

BRIEF DESCRIPTION OF DRAWINGS

FIG. 1 is a view illustrating the schematic construction of a vehicle to which the present disclosure is applied.

FIG. 2 is a view illustrating the schematic construction of an EHC.

FIG. 3 is a view illustrating a correlation between a soak time and a bed temperature (Tcat).

FIG. 4 is a view illustrating the change over time of the bed temperature (Tcat) in the case of electrically energizing the EHC with an electric power of a reference energization amount.

FIG. 5 is a view for making a comparison between the change over time of the bed temperature (Tcat) in the case where an amount of adhesion of condensed water is large and the change over time of the bed temperature (Tcat) in the case where the amount of adhesion of condensed water is small.

FIG. 6 is a view illustrating the changes over time of the bed temperature (Tcat), an electric resistance value (Rcat) of the EHC, and a resistance difference (ΔR).

FIG. 7 is a view illustrating a correlation between the amount of adhesion of condensed water and the resistance difference.

FIG. 8 is a view illustrating a correlation between the resistance difference and an electrical energization shortage amount.

FIG. 9 is a flow chart illustrating a processing routine which is executed by an ECU in preheat processing according to a first embodiment of the present disclosure.

FIG. 10 is a flow chart illustrating a processing routine which is executed by an ECU in preheat processing according to a modification of the first embodiment of the present disclosure.

FIG. 11 is a flow chart illustrating a processing routine which is executed by an ECU in preheat processing and exhaust gas temperature raising processing according to a second embodiment of the present disclosure.

FIG. 12 is a view illustrating a correlation between a resistance difference and an execution time of the exhaust gas temperature raising processing according to the second embodiment of the present disclosure.

DESCRIPTION OF EMBODIMENTS

Hereinafter, specific embodiments of the present disclosure will be described based on the attached drawings. However, the dimensions, materials, shapes, relative arrangements and so on of component parts described in the embodiments are not intended to limit the technical scope of the present disclosure to these alone in particular as long as there are no specific statements.

First Embodiment

First, reference will be made to a first embodiment of the present disclosure based on FIGS. 1 through 9. FIG. 1 is a view illustrating the schematic construction of an exhaust system of an internal combustion engine according to the present disclosure.

FIG. 1 is also a view illustrating the schematic construction of a vehicle to which the present disclosure is applied. In FIG. 1, the vehicle denoted by 100 has a hybrid system mounted thereon for driving wheels 58 which are drive wheels. The hybrid system is provided with an internal combustion engine 1, a power dividing mechanism 51, an electric motor 52, a generator 53, a battery 54, an inverter 55, an axle (drive shaft) 56, and a reduction gear 57.

The internal combustion engine 1 is a spark ignition internal combustion engine (a gasoline engine) having a plurality of cylinders 1a, and is provided with spark plugs 1b each for igniting a mixture formed within each cylinder 1a. Here, note that in an example illustrated in FIG. 1, the internal combustion engine 1 has four cylinders, but instead, the internal combustion engine 1 may have three or less cylinders, or may have five or more cylinders. In addition, the internal combustion engine 1 may be a compression ignition internal combustion engine (a diesel engine). An output shaft of the internal combustion engine 1 is connected with a rotation shaft of the generator 53 and a rotation shaft of the electric motor 52 through the power dividing mechanism 51.

The rotation shaft of the generator 53 is connected with a crankshaft of the internal combustion engine 1 through the power dividing mechanism 51, so that the generator 53 generates electricity by mainly using the kinetic energy of the crankshaft. In addition, the generator 53 can also act as a starter motor by driving the crankshaft to rotate through the power dividing mechanism 51 at the time of starting the internal combustion engine 1. Moreover, the electric power generated by the generator 53 is stored in the battery 54 through the inverter 55, or is supplied to the electric motor 52.

The rotation shaft of the electric motor 52 is connected with the axle 56 through the reduction gear 57, whereby the wheels 58 are driven to rotate by making use of the electric power supplied to the electric motor 52 from the battery 54 or the generator 53 through the inverter 55. In addition, the rotation shaft of the electric motor 52 is also connected with the power dividing mechanism 51, so that it can assist the internal combustion engine 1 thereby to drive the wheels 58 to rotate, too.

The power dividing mechanism 51 is composed of a planetary gear device, and divides power among the internal combustion engine 1, the electric motor 52 and the generator 53. For example, the power dividing mechanism 51 adjusts the travel speed of the vehicle 100 by adjusting the amount of power generation of the generator 53 thereby to operate the electric motor 52, while making the internal combustion engine 1 operate in the most efficient operating region.

The inverter 55 converts direct current power supplied from the battery 54 to alternating current power, and supplies it to the electric motor 52. In addition, the inverter 55 converts alternating current power supplied from the generator 53 to direct current power, and supplies it to the battery 54. On such an inverter 55, there is mounted a water temperature sensor 59 for detecting the temperature of cooling water of the inverter 55.

Here, the internal combustion engine 1 is equipped with fuel injection valves (illustration omitted) that inject fuel into the cylinders 1a or intake ports, respectively, wherein heat energy is generated by igniting and burning a mixture formed of air and fuel injected from each fuel injection valve by means of each spark plug 1b, so that the crankshaft is driven to rotate by use of the heat energy thus generated.

An intake pipe 10 is connected to such an internal combustion engine 1. The intake pipe 10 is to guide fresh air (hereinafter simply air) taken in from the atmosphere to each cylinder of the internal combustion engine 1. In the middle of the intake passage 10, there are arranged an air flow meter 12 and a throttle valve 13. The air flow meter 12 outputs an electric signal correlated with a mass of air (i.e., an amount of intake air) supplied to the internal combustion engine 1. The throttle valve 13 serves to adjust the amount of intake air in the internal combustion engine 1 by changing the channel cross section of the intake pipe 10.

In addition, an exhaust pipe 11 is connected to the internal combustion engine 1. The exhaust pipe 11 serves to flow a burnt gas (exhaust gas) burned in the interior of each cylinder of the internal combustion engine 1. In the middle of the exhaust pipe 11, there is arranged an electrically heated catalyst (EHC) 2 which is an exhaust gas purification catalyst equipped with a heat generating element which is electrically energized to generate heat. An air fuel ratio sensor (A/F sensor) 14 and a first exhaust gas temperature sensor 15 are arranged on the exhaust pipe 11 at the upstream side of the EHC 2. The A/F sensor 14 outputs an electrical signal which is correlated with an air fuel ratio of exhaust gas. The first exhaust gas temperature sensor 15 outputs an electrical signal which is correlated with the temperature of the exhaust gas flowing into the EHC 2. Moreover, a second exhaust gas temperature sensor 16 is arranged on the exhaust passage 11 at the downstream side of the EHC 2. The second exhaust gas temperature sensor 16 outputs an electrical signal which is correlated with the temperature of the exhaust gas flowing out from the EHC 2. Here, note that only either one of the first exhaust gas temperature sensor 15 and the second exhaust gas temperature sensor 16 may be arranged on the exhaust pipe 11.

An ECU (Electronic Control Unit) 20 is provided along with the hybrid system constructed in this manner. The ECU 20 is an electronic control unit which is composed of a CPU, a ROM, a RAM, a backup RAM, and so on.

The ECU 20 is electrically connected to an accelerator position sensor 17 in addition to various kinds of sensors such as the water temperature sensor 59, the air flow meter 12, the A/F sensor 14, the first exhaust gas temperature sensor 15, the second exhaust gas temperature sensor 16, and so on. The accelerator position sensor 17 is a sensor that outputs an electrical signal correlated with an amount of operation (accelerator opening) of an accelerator pedal.

The ECU 20 controls, based on the output signals of the various kinds of sensors, the internal combustion engine 1, its peripheral devices (e.g., the spark plugs 1b, the throttle valve 13, the fuel injection valves, the EHC 2, and so on), the electric motor 52, the generator 53, and the inverter 55. Here, note that the ECU 20 may be divided into an ECU that controls the entire hybrid system, and an ECU for controlling the internal combustion engine 1 and its peripheral devices.

Now, the schematic construction of the EHC 2 will be explained based on FIG. 2. An arrow in FIG. 2 indicates a direction of flow of exhaust gas. The EHC 2 is provided with a catalyst carrier 3 formed into a columnar shape, a tubular inner cylinder 6 configured to cover the catalyst carrier 3, and a case 4 configured to cover the inner cylinder 6. The catalyst carrier 3, the inner cylinder 6 and the case 4 are arranged in alignment with one another.

The catalyst carrier 3 is a structural member in which a plurality of passages extending in the direction of flow of the exhaust gas are arranged in a honeycomb shape, wherein the structural member has an outer shape formed into a columnar shape. In the catalyst carrier 3, there is supported an oxidation catalyst, a three-way catalyst, a storage reduction catalyst (NSR (NOx Storage Reduction) Catalyst), a selective catalytic reduction catalyst (SCR (Selective Catalytic Reduction) Catalyst), or an exhaust gas purification catalyst 31 which is composed of a combination of these catalysts. Here, note that the catalyst carrier 3 in this embodiment is formed of a material such as porous ceramics (SiC), which has a relatively large electric resistance, and of which an electric resistance value becomes larger when the temperature thereof is low than when it is high (i.e., a material having an NTC characteristic).

The inner cylinder 6 is formed by molding into a cylindrical or tubular shape an electrically insulating material which is low in electric conductivity and high in heat resistance (e.g., alumina, or a stainless steel material with its surface coated with an electrically insulating layer). The inner cylinder 6 is formed in such a manner that an inside diameter of the inner cylinder 6 becomes larger than an outside diameter of the catalyst carrier 3.

The case 4 is a housing made of metal (e.g., a stainless steel material) which receives therein the catalyst carrier 3 and the inner cylinder 6. The case 4 is provided with a cylindrical portion that has an inside diameter larger than an outside diameter of the inner cylinder 6, an upstream side conical portion that is connected with an upstream side end portion of the cylindrical portion, and a downstream side conical portion that is connected with a downstream side end portion of the cylindrical portion. The upstream side conical portion and the downstream side conical portion are each formed into a tapered shape in which an inside diameter thereof becomes smaller in accordance with an increasing separation or distance thereof from the cylindrical portion.

Cylindrical mat members 5 are press fitted between an inner peripheral surface of the inner cylinder 6 and an outer peripheral surface of the catalyst carrier 3, as well as between an inner peripheral surface of the case 4 and an outer peripheral surface of the inner cylinder 6, respectively. The mat members 5 are each formed of an insulating material which is low in electrical conductivity and high in shock-absorbing property (e.g., an inorganic fiber mat such as an alumina fiber mat or the like).

A pair of through holes 9, which extend through the case 4, the mat members 5 and the inner cylinder 6, are formed at two mutually opposing locations, respectively, in the outer peripheral surface of the case 4. Electrodes 7 are arranged in the through holes 9. Each of the electrodes 7 is provided with a surface electrode 7a extending along the outer peripheral surface of the catalyst carrier 3 in a circumferential direction and in an axial direction, and a shaft electrode 7b extending from an outer peripheral surface of the surface electrode 7a to the outside of the case 4 through a through hole 9.

Support members 8, which serve to support the shaft electrodes 7b, respectively, are arranged in the vicinities of the through holes 9, respectively, in the case 4. The support members 8 are formed in such a manner so as to cover annular opening portions between the case 4 and the shaft electrodes 7b, respectively. Here, note that the support members 8 are each formed of an insulating material with low electrical conductivity, and serve to suppress the shaft electrodes 7b and the case 4 from being short-circuited to each other.

Moreover, the shaft electrodes 7b are electrically connected to the battery 54 through a supply power control unit 18. The supply power control unit 18 is controlled by the ECU 20, so that it adjusts switching between the supply (energization of the EHC 2) and the stop of supply (de-energization of the EHC 2) of electrical energy to the electrodes 7 from the battery 54, as well as the amount of electric energy supplied to the electrodes 7 from the battery 54.

According to the EHC 2 constructed in this manner, when the supply power control unit 18 controls to energize the shaft electrodes 7b from the battery 54, the catalyst carrier 3 becomes electric resistance and generates heat, thereby heating the exhaust gas purification catalyst 31 supported by the catalyst carrier 3. Accordingly, when the electrical energization to the shaft electrodes 7b from the battery 54 is carried out in a state where the temperature of the exhaust gas purification catalyst 31 is low, the temperature of the exhaust gas purification catalyst 31 can be raised quickly. In particular, when the shaft electrodes 7b are electrically energized from the battery 54 in advance of starting of the internal combustion engine 1, the exhaust emission at the time of, and immediately after, the starting of the internal combustion engine 1 can be suppressed to be small.

Here, a control method for the EHC 2 in this embodiment will be explained. First, the ECU 20 controls the supply power control unit 18 in such a manner that when the hybrid system is in an activated state (i.e., in a state where the vehicle can run), the internal combustion engine 1 is in a stopped state, and when the temperature of the exhaust gas purification catalyst 31 is lower than a predetermined temperature (e.g., an activation temperature of the exhaust gas purification catalyst 31), the EHC 2 is electrically energized.

Specifically, when the hybrid system is activated, first, the ECU 20 detects an SOC (State Of Charge) of the battery 54. The SOC is a ratio of a maximum amount of electric power capable of being discharged at the present point in time with respect to a maximum amount of electric power capable of being stored by the battery 54 (a capacity of the electric power stored at the time of full charge), and it is obtained by integrating a charge and discharge current of the battery 54.

Further, the ECU 20 obtains the temperature of a central portion of the exhaust gas purification catalyst 31 at the time of actuation of the hybrid system (hereinafter, sometimes also referred to as a "bed temperature"). The bed temperature in that case is estimated based on a bed temperature Tend at the time of the last stop of operation of the internal combustion engine 1, and a period of time (a soak time) from the time of the last stop of operation of the internal combustion engine 1 until the hybrid system is activated. Here, the relation between the bed temperature Tcat of the exhaust gas purification catalyst 31 and the soak time is illustrated in FIG. 3. When the operation of the internal combustion engine 1 is stopped (at t0 in FIG. 3), the bed temperature Tcat of the exhaust gas purification catalyst 31 decreases over time from the temperature Tend thereof at the time of the last stop of operation of the internal combustion engine 1. After that, when the bed temperature Tcat of the exhaust gas purification catalyst 31 drops equal to an outside air temperature Tatm (at t1 in FIG. 3), the bed temperature Tcat thereafter will be stabilized to the temperature equal to the outside air temperature Tatm. Accordingly, in this embodiment, it is assumed that the correlation as illustrated in FIG. 3 has been obtained in advance based on the results of experiments or simulations, and has been stored in the ROM of the ECU 20 or the like in the form of a map or a function expression, which can derive the bed temperature at the time of actuation of the hybrid system by using, as arguments, the bed temperature Tend at the time of the stop of the operation of the internal combustion engine 1, and the soak time. Here, note that the bed temperature Tend at the time of the stop of the operation of the internal combustion engine 1 may be estimated from a measured value of the first exhaust gas temperature sensor 15 and/or a measured value of the second exhaust gas temperature sensor 16 immediately before the stop of the operation of the internal combustion engine 1, or may be estimated from the history of the last operation of the internal combustion engine 1.

The ECU 20 determines whether the bed temperature of the exhaust gas purification catalyst 31 at the time of actuation of the hybrid system is lower than the predetermined temperature. When the bed temperature of the exhaust gas purification catalyst 31 at the time of actuation of the hybrid system is lower than the predetermined temperature, the ECU 20 calculates an amount of energization (a reference energization amount) of the EHC 2 required to raise the bed temperature of the exhaust gas purification catalyst 31 to the predetermined temperature. The reference energization amount in that case is calculated, for example, in such a manner that it becomes larger in the case where the bed temperature of the exhaust gas purification catalyst 31 at the time of actuation of the hybrid system is low than in the case where it is high. Subsequently, the ECU 20 calculates an amount of consumption SOCcom of the SOC in the case of assuming that the electric power of the reference energization amount is supplied to the EHC 2. The ECU 20 calculates a remaining amount ΔSOC (=SOC−SOCcom) of the SOC by subtracting the amount of consumption SOCcom from the SOC at the time when the hybrid system is activated. The ECU 20 determines whether the remaining amount ΔSOC of the SOC is equal to or more than a lower limit value. The "lower limit value" referred to herein is defined such that when the SOC decreases below the lower limit value, it is determined that there is a need to start the internal combustion engine 1 thereby to charge the battery 54.

In cases where the remaining amount ΔSOC is equal to or more than the lower limit value, the ECU 20 starts to supply electric power to the EHC 2 when the SOC becomes equal to a value which is a sum of the consumption SOCcom and the lower limit value added by a margin. Here, note that in cases where the remaining amount ΔSOC is equal to or more than an amount at which an EV travel (a state where the vehicle 100 is driven to travel only by the electric motor 52) can be continued for a fixed period of time, when a travel request is generated for the vehicle 100, the vehicle 100 may be driven to travel only by the electric motor 52, and electric power may be supplied to the EHC 2 from the battery 54. The "fixed period of time" referred to herein is, for example, a period of time which is longer than the time required for supplying the electric power of the reference energization amount to the EHC 2.

When an integrated value of the electric power supplied to the EHC 2 reaches the reference energization amount, the ECU 20 stops the supply of the electric power to the EHC 2 from the battery 54, and starts the internal combustion engine 1. Thus, when the electric power of the reference energization amount is supplied to the EHC 2 before the starting of the internal combustion engine, the temperature of the exhaust gas purification catalyst 31 at the time of starting of the internal combustion engine 1 can be made high in advance. As a result, the purification performance of the exhaust gas purification catalyst 31 at the time of, and immediately after, the starting of the internal combustion engine 1 can be improved, and exhaust emission can be suppressed to be small. Hereinafter, processing to preheat the exhaust gas purification catalyst 31 before the starting of the internal combustion engine as described above is referred to as preheat processing.

However, when the wall surface of the exhaust pipe 11 and so on is cold just as immediately after cold starting of the internal combustion engine 1, the moisture contained in the exhaust gas may condense to generate condensed water. In particular, when a so-called "short trip" is repeated in which the operation of the internal combustion engine 1 is stopped before the internal combustion engine 1 gets warm sufficiently, a relatively large amount of condensed water may accumulate in the interior of the exhaust pipe 3 and so on. Such condensed water may reach the exhaust gas purification catalyst 31 along with the exhaust gas, so that it may adhere to the exhaust gas purification catalyst 31. When the electric power of the reference energization amount is supplied to the EHC 2 in a state where the condensed water has adhered to the exhaust gas purification catalyst 31, the bed temperature of the exhaust gas purification catalyst 31 may not go up to the predetermined temperature. Here, the changes over time of the bed temperature Tcat of the exhaust gas purification catalyst 31 in the case of supplying the electric power of the reference energization amount to the EHC 2 are illustrated in FIG. 4. A solid line in FIG. 4 indicates the change over time of a bed temperature Tcat0 in the case of electrically energizing the EHC 2 in a state where condensed water has not adhered to the exhaust gas purification catalyst 31. On the other hand, an alternate long and short dash line in FIG. 4 indicates the change over time of a bed temperature Tcat1 in the case of electrically energizing the EHC 2 in a state where the condensed water has adhered to the exhaust gas purification catalyst 31.

In FIG. 4, if the condensed water has not adhered to the exhaust gas purification catalyst 31 at a time point of starting energization to the EHC 2 (at t10 in FIG. 4), the bed temperature Tcat0 of the exhaust gas purification catalyst 31 rises with time from Tsta (i.e., a bed temperature of the exhaust gas purification catalyst 31 at the time of actuation of the hybrid system, and hereinafter, it may be described as an "actuation bed temperature") as a starting point. Then, when the electrical energization of the reference energization amount is terminated (at t11 in FIG. 4), the bed temperature Tcat0 of the exhaust gas purification catalyst 31 reaches a predetermined temperature Ttrg. On the other hand, when condensed water has adhered to the exhaust gas purification catalyst 31 at the time point of starting energization to the EHC 2, the bed temperature Tcat1 of the exhaust gas purification catalyst 31 rises with time from an actuation bed temperature Tst as a starting point, in a period of time (i.e., a period of time from t10 to t20 in FIG. 4) after the electrical energization to the EHC 2 is started until the bed temperature Tcat1 of the exhaust gas purification catalyst 31 reaches Tevap (i.e., a temperature at which the condensed water begins to evaporate, e.g., 100 degrees C.). However, in a period of time (an evaporation time period) after the bed temperature Tcat1 of the exhaust gas purification catalyst 31 reaches the above-mentioned Tvap (at t20 in FIG. 4) until the condensed water adhered to the exhaust gas purification catalyst 31 finishes evaporating (at t21 in FIG. 4), the heat energy generated by the electrical energization of the EHC 2 is consumed by evaporation of the condensed water, so the bed temperature Tcat1 of the exhaust gas purification catalyst 31 stagnates in the vicinity of Tevap. Then, when the condensed water adhered to the exhaust gas purification catalyst 31 finishes evaporating (at t21 in FIG. 4), the bed temperature Tcat1 of the exhaust gas purification catalyst 31 begins to rise again. In this manner, when condensed water has adhered to the exhaust gas purification catalyst 31 at the time of the start of the energization to the EHC 2, a part of the heat energy generated by the energization of the EHC 2 is consumed by evaporation of the condensed water, so the temperature which can be reached by the bed temperature Tcat1 of the exhaust gas purification catalyst 31 at the time when the electrical energization of the reference energization amount is terminated (at t11 in FIG. 4) becomes lower than the predetermined temperature Ttrg.

In addition, as illustrated in FIG. 5, the evaporation time period (t20-t21' in FIG. 5) in the case where the amount of the condensed water adhered to the exhaust gas purification catalyst 31 (the amount of adhesion of the condensed water) at the time point of starting energization to the EHC 2 is large (i.e., indicated by an alternate long and two short dashes line in FIG. 5) becomes longer than an evaporation time period (t20-t21 in FIG. 5) in the case where the amount of adhesion of the condensed water is small (i.e., indicated by an alternate long and short dash line in FIG. 5). This is because in the case where the amount of adhesion of the condensed water is large, the heat energy consumed by evaporation of the condensed water becomes larger in comparison with the case where it is small. As a result, the temperature which can be reached by the bed temperature Tcat1 of the exhaust gas purification catalyst 31 at the time when the electrical energization of the reference energization amount is terminated (at t11 in FIG. 5) becomes lower in the case where the amount of adhesion of the condensed water is large than in the case where it is small.

In view of the tendencies as illustrated in the above-mentioned FIG. 4 and FIG. 5, it is necessary to adjust the amount of energization of the EHC 2 according to the amount of adhesion of the condensed water, in order to raise the bed temperature Tcat of the exhaust gas purification catalyst 31 to the predetermined temperature Ttrg by the preheat processing.

Accordingly, in this embodiment, the amount of energization of the EHC 2 is adjusted based on a difference (a resistance difference) between an actual electric resistance value of the EHC 2 and a predetermined reference resistance value after a predetermined period of time has elapsed from the start of the energization of the EHC 2. The "predetermined period of time" referred to herein is a period of time required for the condensed water adhered to the exhaust gas purification catalyst 31 at an energization start time point to finish evaporating from the start of the energization to the EHC 2, and is shorter than a period of time required in order for the electric power of the reference energization amount to be supplied to the EHC 2. In addition, the predetermined reference resistance value is an electric resistance value of the EHC 2 in the case of electrically energizing the EHC 2 in a state where condensed water has not adhered to the exhaust gas purification catalyst 31.

FIG. 6 is a timing chart illustrating the changes over time of the bed temperature Tcat of the exhaust gas purification catalyst 31, the electric resistance value Rcat of the EHC 2 and the resistance difference $\Delta R$, after the start of the energization. Solid lines in FIG. 6 indicate the changes over time of the above individual things (values) in the case where condensed water has not adhered to the exhaust gas purification catalyst 31 at the time point of starting energization to the EHC 2. Alternate long and short dash lines in FIG. 6 indicate the changes over time of the above individual values in the case where a relatively small amount of condensed water has adhered to the exhaust gas purification catalyst 31 at the time point of starting energization to the EHC 2. Alternate long and two short dashes lines in FIG. 6 indicate the changes over time of the above individual values in the case where a relatively large amount of condensed water has adhered to the exhaust gas purification catalyst 31 at the time point of starting energization to the EHC 2.

In FIG. 6, when condensed water has not adhered to the exhaust gas purification catalyst 31 at the time point of starting energization to the EHC 2, the bed temperature Tcat0 of the exhaust gas purification catalyst 31 rises with time toward the predetermined temperature Ttrg from the actuation bed temperature Tst, as mentioned above. On the other hand, when the condensed water has adhered to the exhaust gas purification catalyst 31 at the time point of starting energization to the EHC 2, the bed temperatures Tcat1, Tcat2 of the exhaust gas purification catalyst 31 immediately after the start of the energization of the EHC 2 rise with time from the actuation bed temperature Tst as a starting point. However, in the evaporation time periods (t20-t21, t20-t21') after the bed temperatures Tcat1, Tcat2 of the exhaust gas purification catalyst 31 each reach the temperature Tevap at which the condensed water begins to evaporate until the condensed water finishes evaporating, the bed temperatures Tcat1, Tcat2 each stagnate in the vicinity of Tevap. Then, when the condensed water adhered to the exhaust gas purification catalyst 31 finishes evaporating (at t21, t21'), the bed temperatures Tcat1, Tcat2 each begin to rise again.

Moreover, in cases where the condensed water has not adhered to the exhaust gas purification catalyst 31 at the time point of starting energization to the EHC 2, an electric resistance value Rcat0 of the EHC 2 (corresponding to the predetermined reference resistance value) decreases with time. On the other hand, in cases where condensed water has adhered to the exhaust gas purification catalyst 31 at the time point of starting energization to the EHC 2, electric resistance values Rcat1, Rcat2 of the EHC 2 decrease with time. However, in predetermined periods of time (t10-t21, t10-t21') from the start of the energization until the condensed water finishes evaporating, an amount of decrease per unit time (a rate of decrease) of each of the electric resistance values Rcat1, Rcat2 becomes smaller than the rate of decrease of the reference resistance value Rcat0. With this, resistance differences $\Delta R1$, $\Delta R2$ each increase with time from the start of the energization of the EHC 2 until the predetermined periods of time (t10-t21, t10-t21') each elapse. Then, after the predetermined periods of time (t10-t21, t10-t21') each elapse from the start of the energization of the EHC 2, the electric resistance values Rcat1, Rcat2 each decrease at the rate of decrease substantially equivalent to that of the reference resistance value Rcat0. As a result of this, after the predetermined periods of time (t10-t21, t10-t21') each elapse from the start of the energization of the EHC 2, the resistance differences $\Delta R1$, $\Delta R2$ each become substantially constant (i.e., the amounts of change per unit time of the resistance differences $\Delta R1$, $\Delta R2$ each become substantially zero). Here, note that the rate of decrease of the electric resistance value in each of the predetermined periods of time (t10-t21, t10-t21') becomes smaller in the case where the amount of adhesion of the condensed water is large (Rcat2) than in the case where it is small (Rcat1). For that reason, the resistance difference after the lapse of each of the predetermined periods of time (t10-t21, t10-t21') from the start of the energization to the EHC 2 becomes larger in the case where the amount of adhesion of the condensed water is large ($\Delta R2$) than in the case where it is small ($\Delta R1$).

Here, it is presumed that in FIG. 6, in spite of the fact that the bed temperatures Tcat1, Tcat2 in the evaporation time periods (t20-t21, t20-t21') each become substantially constant, a slight decrease in each of the electric resistance values Rcat1, Rcat2 in the same evaporation time periods results from a rise in the temperature of a portion of the exhaust gas purification catalyst 31 in the vicinity of each of the surface electrodes 7a (i.e., a peripheral portion of the exhaust gas purification catalyst 31).

According to the above-mentioned correlation as illustrated in FIG. 6, the resistance difference $\Delta R$ after the predetermined period of time elapses from the start of the energization of the EHC 2 becomes larger as the amount of the condensed water adhered to the exhaust gas purification catalyst 31 at the energization start time point increases, as illustrated in FIG. 7. Accordingly, in the preheat processing of this embodiment, the ECU 20 obtains a shortage amount of electrical energization (i.e., an electrical energization shortage amount) based on the resistance difference $\Delta R$ after the lapse of the predetermined period of time from the start of the energization of the EHC 2, and the EHC 2 is energized or supplied with electric power by adding an amount of electrical energization (electric power) for the electrical energization shortage amount to the reference energization amount. The "electrical energization shortage amount" referred to herein is an amount of energization (electric power) necessary for generating, in the EHC 2, a shortage amount of heat energy (a heat energy shortage amount) which runs short when raising the bed temperature Tcat of the exhaust gas purification catalyst 31 to the predetermined temperature Ttrg, and it is made larger, as the resistance difference $\Delta R$ becomes larger, for example, as illustrated in FIG. 8. Here, note that the correlation as illustrated in FIG. 8 has been obtained in advance based on the results of experiments or simulations, and has been stored in the ROM of the ECU 20 or the like in the form of a map or a function expression, which can derive the electrical energization shortage amount by using the resistance difference $\Delta R$ as an argument.

(Processing Flow)

Here, a flow for the preheat processing in this embodiment will be explained based on FIG. 9. FIG. 9 is a flow chart illustrating a processing routine which is executed by the ECU 20 in the preheat processing according to this embodiment. The processing routine illustrated in FIG. 9 is carried out by the ECU 20 at the time of actuation of the hybrid system, and has been stored in advance in the ROM of the ECU 20 or the like.

In the processing routine of FIG. 9, first in step S101, the ECU 20 determines whether the actuation bed temperature Tst of the exhaust gas purification catalyst 31 is lower than the predetermined temperature Ttrg. In that case, the ECU 20 should just derive the actuation bed temperature Tst by accessing the map or the function expression as illustrated in FIG. 3, using as arguments the bed temperature Tend at a point in time at which the last operation of the internal combustion engine 1 was stopped and the soak time, as mentioned above.

In cases where a negative determination is made in the step S101 (Tst≥Ttrg), it is not necessary to warm up the exhaust gas purification catalyst 31, so the ECU 20 ends this processing routine, without carrying out the preheat processing. On the other hand, in cases where an affirmative determination is made in the S101 (Tst<Ttrg), it is necessary to warm up the exhaust gas purification catalyst 31, so the ECU 20 goes to the processings of step S102 and subsequent steps.

In step S102, the ECU 20 sets the reference energization amount Qbase as a target energization amount Qtrg. In that case, the ECU 20 obtains the reference energization amount Qbase based on the actuation bed temperature Tst obtained in the step S101. The reference energization amount Qbase referred to herein is an amount of energization capable of raising the bed temperature Tcat of the exhaust gas purification catalyst 31 to the predetermined temperature Ttrg or higher by supplying the electric power of the reference energization amount Qbase to the EHC 2 if condensed water has not adhered to the exhaust gas purification catalyst 31 at the time point of starting energization to the EHC 2, and it is set to a larger value as the actuation bed temperature Tst becomes lower. Here, note that a correlation between the actuation bed temperature Tst and the reference energization amount Qbase has been obtained in advance based on the results of experiments or simulations, and has been stored in the ROM of the ECU 20, etc., in the form of a map or function expression which can derive the reference energization amount Qbase by using the actuation bed temperature Tst as an argument.

In step S103, the ECU 20 controls the supply power control unit 18 in order to start to supply electric power to the EHC 2 from the battery 54. In this embodiment, the electric power supplied per unit time to the EHC 2 from the battery 54 is fixed to a fixed amount q which has been decided in advance.

In step S104, the ECU 20 calculates an integrated value Q of the electric power (an integrated amount of electric power) which has been supplied to the EHC 2 in a period of time from the time point of starting energization to the current point in time. Specifically, the ECU 20 calculates the integrated amount of electric power Q by adding the fixed amount q to the last value Qold of the integrated amount of electric power.

In step S105, the ECU 20 determines whether a correction flag is off. The "correction flag" referred to herein is set to on when correction processing for the target energization amount Qtrg based on the resistance difference $\Delta R$ is carried out in step S110 to be described later, but on the other hand, it is set to off when the electrical energization with respect to the EHC 2 is terminated in step S113 to be described later. In cases where a negative determination is made in the S105, the correction processing for the target energization amount Qtrg has already been executed, so the ECU 20 goes to step S111, while skipping the processings of steps S106 through S111. On the other hand, in cases where an affirmative determination is made in the S105, the correction processing for the target energization amount Qtrg has not yet been executed, so the ECU 20 executes the processings of steps S106 through S111 in a sequential manner.

In step S106, the ECU 20 determines whether a predetermined period of time has elapsed from the start of the energization of the EHC 2. The "predetermined period of time" referred to herein is a period of time required for the condensed water adhered to the exhaust gas purification catalyst 31 at the energization start time point to finish evaporating from the start of the energization of the EHC 2, as mentioned above. As a method for determining whether the predetermined period of time has elapsed from the start of the energization of the EHC 2, there can be used a method for determining that the predetermined period of time has elapsed from the start of the energization of the EHC 2, on condition that the resistance difference $\Delta R$ is substantially constant (i.e., an amount of change per unit time of the resistance difference $\Delta R$ is equal to or less than a predetermined threshold value). In other words, as described in the above-mentioned explanation of FIG. 6, in a period of time from the start of the energization of the EHC 2 until the predetermined period of time elapses, the resistance difference $\Delta R$ increases with time (i.e., the amount of change per unit time of the resistance difference $\Delta R$ becomes larger than the predetermined threshold value), but on the other hand, after the predetermined period of time has elapsed from the start of the energization of the EHC 2, the resistance difference $\Delta R$ becomes substantially constant (i.e., the amount of change per unit time of the resistance difference $\Delta R$ becomes equal to or less than the predetermined threshold value). For that reason, when the state where the amount of change per unit time of the resistance difference $\Delta R$ becomes equal to or less than the predetermined threshold value continues for a predetermined determination period of time or longer, the resistance difference $\Delta R$ can be assumed to be substantially constant, and hence, it can be determined that the predetermined period of time has elapsed from the start of the energization of the EHC 2. Here, note that the "predetermined threshold value" referred to herein is a small value to such an extent that the resistance difference $\Delta R$ can be assumed to be substantially constant (i.e., the amount of change per unit time of the resistance difference $\Delta R$ can be assumed to be substantially zero). However, in order to make the determination in the step S106 by such a method, it is necessary to obtain an actual electric resistance value Rcat of the EHC 2. The actual electric resistance value Rcat of the EHC 2 can be calculated from a voltage Vehc applied to the electrodes 7, and an electric current Iehc flowing through the electrodes 7 (Rcat=Vehc/Iehc). Accordingly, a voltage sensor and a current sensor are mounted on the electrodes 7 of the EHC 2, so that the electric resistance value Rcat should just be calculated from the measured values Vehc, Iehc of these sensors. On the other hand, the reference resistance value Rcat0 used for the calculation of the resistance difference ΔR is an electric resistance value at the same timing as that at which the electric resistance value Rcat is obtained (i.e., the timing at which the period of time elapsed from the start of the energization becomes the same), in the case where condensed water has not adhered to the exhaust gas purification catalyst and in the case where an amount of electric power equal to the target energization amount Qtrg set in the step S102 is supplied to the EHC which is in a state where the bed temperature of the exhaust gas purification catalyst is equal to the actuation bed temperature Tcat obtained in the step S101. Accordingly, in this embodiment, a correlation among the actuation bed temperature, the target energization amount, the period of time elapsed from the start of the energization, and the reference resistance value Rcat0 has been obtained in advance based on the results of experiments or simulations, and has been stored in the ROM of the ECU 20 in the form of a map or function expression which can derive the reference resistance value Rcat0 by using as arguments the actuation bed temperature, the target energization amount, and the period of time elapsed from the start of the energization.

Here, note that a period of time or an amount of energization required for all the condensed water adhered to the exhaust gas purification catalyst to finish evaporating from the start of the energization of the EHC, in the case where the supply of electric power to the EHC (i.e., the energization of the EHC) is started in a state where a maximum amount of condensed water capable of adhering to the exhaust gas purification catalyst has adhered to the exhaust gas purification catalyst, has been obtained in advance from the results of experiments or simulations, and it may be determined that the predetermined period of time has elapsed from the start of the energization of the EHC 2, on condition that an actual period of time elapsed from the start of the energization of the EHC 2 is equal to or more than the above-mentioned period of time or an actual integrated amount of electric power Q from the start of the energization of the EHC 2 is equal to or more than the above-mentioned amount of energization. Here, note that the maximum amount of condensed water capable of adhering to the exhaust gas purification catalyst corresponds to an amount of adhesion of condensed water in the case where the internal combustion engine 1 is used under the condition in which the amount of adhesion of condensed water becomes the largest.

In cases where a negative determination is made in the step S106, the ECU 20 returns to the processing of step S104. On the other hand, in cases where an affirmative determination is made in the step S106, the ECU 20 goes to step S107. In step S107, the ECU 20 obtains the electric resistance value Rcat of the EHC 2. Specifically, the ECU 20 calculates the electric resistance value Rcat of the EHC 2 based on the voltage Vehc applied to the electrodes 7 of the EHC 2 and the electric current Iehc flowing through the electrodes 7 of the EHC 2, as mentioned above.

In step S108, the ECU 20 calculates the resistance difference ΔR by subtracting the reference resistance value Rcat0 from the electric resistance value Rcat obtained in the step S107. Subsequently, by using as a parameter the resistance difference ΔR calculated in the step S108, the ECU 20 calculates an electrical energization shortage amount Qadd (step S109). Specifically, the ECU 20 derives the electrical energization shortage amount Qadd by accessing the map or the function expression described in the explanation of FIG. 8, using as an argument the resistance difference ΔR calculated in the step S108. In that case, when the resistance difference ΔR calculated in the step S108 is zero (i.e., when condensed water has not adhered to the exhaust gas purification catalyst 31 at the time point of starting energization), the electrical energization shortage amount Qadd is set to zero.

In step S110, the ECU 20 corrects the target energization amount Qtrg calculated in the step S102 by the electrical energization shortage amount Qadd set in the step S109. Specifically, the ECU 20 calculates a new target energization amount Qtrg (=Qtrg+Qadd) by adding the electrical energization shortage amount Qadd set in the step S109 to the target energization amount Qtrg set in the step S102. In that case, when condensed water has adhered to the exhaust gas purification catalyst 31 at the energization start time point, the electrical energization shortage amount Qadd becomes larger than zero, and so, the target energization amount Qtrg after correction becomes larger than the reference energization amount Qbase. When electrical energization to the EHC 2 is carried out according to the target energization amount Qtrg corrected in this manner, the electric power supplied per unit time to the EHC 2 does not change and remains at the fixed amount q, but the period of time of energization of the EHC 2 becomes long, and hence, it becomes possible to supply the electrical energization shortage amount Qadd to the EHC 2 without excess and deficiency.

In step S111, the ECU 20 changes the correction flag from off to on. Subsequently, the ECU 20 goes to step S112, and determines whether the integrated amount of electric power Q calculated in the step S104 is equal to or more than the target energization amount Qtrg corrected in the step S109. In cases where a negative determination is made in the step S112 (Q<Qtrg), the ECU 20 returns to the processing of step S104. On the other hand, in cases where an affirmative determination is made in the step S112 (Q≥Qtrg), the ECU 20 goes to step S113.

In step S113, the ECU 20 controls the supply power control unit 18 in order to terminate the electrical energization to the EHC 2 from the battery 54. Subsequently, the ECU 20 goes to step S114, and changes the correction flag from on to off.

When the preheat processing is carried out according to the procedure illustrated in FIG. 9, the target energization amount of the EHC 2 will be corrected according to the resistance difference which has a high correlation with the amount of the condensed water adhered to the exhaust gas purification catalyst 31 (the amount of adhesion of the condensed water) at the time point of starting energization to the EHC 2. With this, in the case where the condensed water has adhered to the exhaust gas purification catalyst 31 at the time point of starting energization to the EHC 2, the target energization amount is made larger in comparison with the case where the condensed water has not adhered. That is, in the case where the condensed water has adhered to the exhaust gas purification catalyst 31 at the time point of starting energization to the EHC 2, the period of time of energization of the EHC 2 is made longer in comparison with the case where the condensed water has not adhered. Accordingly, even in cases where the condensed water has adhered to the exhaust gas purification catalyst 31 at the time point of starting energization to the EHC 2, it becomes possible to supply the heat energy required in order to raise the temperature of the exhaust gas purification catalyst 31 to the predetermined temperature Ttrg or higher to the exhaust gas purification catalyst 31 without excess and deficiency.

Modification of the First Embodiment

In the above-mentioned first embodiment, reference has been made to an example in which the electric power supplied per unit time to the EHC 2 after the correction of the target energization amount is set to the same electric power as before the correction of the target energization amount. That is, in the above-mentioned first embodiment, there has been described the example in which the electrical energization shortage amount is compensated for by making longer the period of time of energization of the EHC 2. On the other hand, in cases where the target energization amount after correction becomes larger than the target energization amount before correction (i.e., in cases where the electrical energization shortage amount is larger than zero), the electric power supplied per unit time to the EHC 2 after the correction of the target energization amount may be made larger than that before the correction of the target energization amount. That is, the electrical energization shortage amount may be compensated for by making larger the electric power supplied per unit time to the EHC 2.

FIG. 10 is a flow chart illustrating a processing routine which is executed by the ECU 20 in preheat processing according to this modification. In FIG. 10, the same symbols are attached to the same processings as those in the above-mentioned processing routine of FIG. 9.

In the processing routine of FIG. 10, after the processing of step S110 is carried out, the processings of steps S201 and S202 are carried out. In step S201, the ECU 20 determines whether the electrical energization shortage amount Qadd set in step S109 is larger than zero. In cases where a negative determination is made in step S201 (Qadd=0), the ECU 20 goes to step S111, while skipping step S202. On the other hand, in cases where an affirmative determination is made in step S201 (Qadd>0), the ECU 20 goes to step S202.

In S202, the ECU 20 corrects the electric power q supplied per unit time to the EHC 2 by a predetermined amount of correction Δq. Specifically, the ECU 20 calculates a new electric power q (=q+Δq) by adding the predetermined amount of correction Δq to the electric power q before correction. In that case, the predetermined amount of correction Δq may be a fixed value which has been decided in advance, or may be a variable value which is set to a larger value as the electrical energization shortage amount Qadd becomes larger.

When the preheat processing is carried out according to the procedure as illustrated in FIG. 10, it is possible to suppress the execution period of time of the preheating processing from becoming excessively long, in the case where the condensed water has adhered to the exhaust gas purification catalyst 31 at the time point of starting energization to the EHC 2. In particular, when the predetermined amount of correction Δq is set to a larger value as the electrical energization shortage amount Qadd becomes larger, it is possible to suppress an increase in the execution period of time of the preheating processing as short as possible, in the case where the condensed water has adhered to the exhaust gas purification catalyst 31 at the time point of starting energization to the EHC 2.

Second Embodiment

Now, reference will be made to a second embodiment of the present disclosure based on FIGS. 11 and 12. Here, a construction different from that of the above-mentioned first embodiment will be explained, and an explanation of the same construction will be omitted.

In the above-mentioned first embodiment, there has been described the example in which the heat energy of the heat energy shortage amount is compensated for by increasing the target energization amount of the EHC 2 in the preheat processing. In contrast to this, in this second embodiment, reference will be made to an example in which the heat energy of the heat energy shortage amount is compensated for by carrying out exhaust gas temperature raising processing after the starting of the internal combustion engine 1.

FIG. 11 is a flow chart illustrating a processing routine which is executed by the ECU 20 in the preheat processing and the exhaust gas temperature raising processing in this second embodiment of the present disclosure. In FIG. 11, the same symbols are attached to the same processings as those in the above-mentioned processing routine of FIG. 9.

In the processing routine of FIG. 11, the processing of step S301 is carried out, instead of the processing of step S105 in the processing routine of FIG. 9. In addition, in the processing routine of FIG. 11, the processings of steps S302 and S303 are carried out, instead of the processings of steps S109 through S111 in the processing routine of FIG. 9. Moreover, in the processing routine of FIG. 11, the processings of steps S304 through S307 are carried out, instead of the processing of step S114 in the processing routine of FIG. 9.

In step S301, the ECU 20 determines whether a warm-up flag is off. The "warm-up flag" referred to herein is a flag which is set to on when setting processing of a warm-up time Extime is carried out in step S303 to be described later, and which is set to off when a negative determination is made in step S305 to be described later, or when the exhaust gas temperature raising processing is carried out in step S306 to be described later. In cases where a negative determination is made in the step S301, the ECU 20 goes to step S112, while skipping steps S106, S107 and steps S302, S303. On the other hand, in cases where an affirmative determination is made in the step S301, the ECU 20 goes to step S302, after carrying out the processings of steps S106 through S108 in a sequential manner.

In step S302, the ECU 20 sets, based on the resistance difference ΔR calculated in the step S108, the execution (or warm-up) time Extime of the exhaust gas temperature raising processing carried out after the starting of the internal combustion engine 1. In that case, the ECU 20 sets the execution time Extime of the exhaust gas temperature raising processing longer, as the resistance difference ΔR calculated in the step S108 becomes larger, as illustrated in FIG. 12. This is because the heat energy shortage amount becomes larger as the resistance difference ΔR calculated in the step S108 becomes larger. Here, note that a correlation between the resistance difference ΔR and the execution time Extime of the exhaust gas temperature raising processing, as illustrated in FIG. 12, has been obtained in advance based on the results of experiments or simulations, and has been stored in the ROM of the ECU 20, etc., in the form of a map or function expression which can derive the execution time Extime of the exhaust gas temperature raising processing by using the resistance difference ΔR as an argument.

In step S303, the ECU 20 changes the warm-up flag from off to on, as mentioned above. Subsequently, the ECU 20 carries out the processings of steps S304 through S307, after carrying out the processings of steps S112 and S113 in a sequential manner.

In step S304, the ECU 20 starts the internal combustion engine 1. Subsequently, in step S305, the ECU 20 determines whether the execution time Extime of the exhaust gas temperature raising processing set in the step S302 is larger than zero (i.e., whether it is necessary to carry out the exhaust gas temperature raising processing). In cases where a negative determination is made in the step S305 (Extime=0), the ECU 20 goes to step S307, while skipping step S306. On the other hand, in cases where an affirmative determination is made in the step S305 (Extime>0), the ECU 20 goes to step S306.

In step S306, the ECU 20 carries out the exhaust gas temperature raising processing. The exhaust gas temperature raising processing in that case is carried out according to the execution time Extime set in the step S302. The "exhaust gas temperature raising processing" referred to herein is processing for raising the temperature of the exhaust gas discharged from the internal combustion engine 1, and the temperature of the exhaust gas discharged from the internal combustion engine 1 may be raised, for example, by retarding the ignition timings of the spark plugs 1b. Here, note that in cases where the internal combustion engine 1 is a compression ignition internal combustion engine, the temperature of the exhaust gas discharged from the internal combustion engine 1 may be raised by carrying out processing to retard the fuel injection timing, or processing to perform post injection.

After carrying out the processing of the step S306, the ECU 20 goes to step S307, and changes the warm-up flag from on to off.

When the preheat processing and the catalyst warm-up processing are carried out according to the procedure illustrated in FIG. 11, the heat energy of the heat energy shortage amount will be compensated for by the exhaust gas temperature raising processing. For that reason, in cases where condensed water has adhered to the exhaust gas purification catalyst 31 at the time point of starting energization to the EHC 2, it becomes possible to supply the heat energy of the heat energy shortage amount to the exhaust gas purification catalyst 31 without excess and deficiency, while suppressing an increase in the consumption SOCcom of the SOC.

Modification of the Second Embodiment

In the above-mentioned second embodiment, there has been described an example in which all the heat energy of the heat energy shortage amount is compensated for by the exhaust gas temperature raising processing, but the heat energy of the heat energy shortage amount may in principle be compensated for by correcting to increase the target energization amount of the EHC 2 in the preheat processing, and only in cases where the internal combustion engine 1 has to be started in the middle of execution of the preheat processing, the heat energy of the heat energy shortage amount may be compensated for by carrying out the exhaust gas temperature raising processing.

Here, in cases where it is determined that the remaining amount ΔSOC of the battery 54 is smaller than a threshold value, or in case where the required driving force of the vehicle 100 becomes large during the electrical energization of the EHC 2, the internal combustion engine 1 has to be started, before the integrated amount of electric power of the EHC 2 reaches the target energization amount. In that case, the electrical energization to the EHC 2 is stopped before the integrated amount of electric power of the EHC 2 reaches the target energization amount, so the bed temperature of the exhaust gas purification catalyst 31 can not be raised to the predetermined temperature only by the preheat processing. Accordingly, in cases where the internal combustion engine 1 is started before the integrated amount of electric power of the EHC 2 reaches the target energization amount, the exhaust gas temperature raising processing may be carried out after the starting of the internal combustion engine 1. The execution time of the exhaust gas temperature raising processing in that case should just be decided based on a difference between the total amount of electric power (the integrated amount of electric power) which has been supplied to the EHC 2 in a period of time from the start to the stop of the energization, and the target energization amount. In other words, the execution time of the exhaust gas temperature raising processing should just be set longer, as the difference between the integrated amount of electric power and the target energization amount in the period of time from the start to the stop of the energization becomes larger. According to this, even in cases where the internal combustion engine 1 is started in the middle of the preheat processing, the heat energy of the heat energy shortage amount can be supplied to the exhaust gas purification catalyst 31 without excess and deficiency.

<Others>

Although in the above-mentioned respective embodiments and modifications, there have been described examples in which the present disclosure is applied to the electrically heated catalyst having an NTC characteristic, the present disclosure can also be applied to an electrically heated catalyst having a PTC characteristic. With the electrically heated catalyst having a PTC characteristic, the electric resistance value thereof becomes smaller when the temperature thereof is low than when it is high. For that reason, the resistance difference used for the calculation of the electrical energization shortage amount should just be obtained by subtracting the actual electric resistance value from the reference resistance value.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An exhaust gas purification apparatus for an internal combustion engine comprising:
   an electrically heated catalyst arranged in an exhaust passage of an internal combustion engine and including a heat generation element that generates heat by being energized and an exhaust gas purification catalyst; and
   a controller including at least one processor,
   wherein the controller is configured to:
   start electrical energization of the electrically heated catalyst before starting of the internal combustion engine;
   obtain an electric resistance value of the electrically heated catalyst after the lapse of a predetermined period of time which is a period of time required for condensed water adhered to the electrically heated catalyst to finish evaporating from the start of energization of the electrically heated catalyst by the controller;
   calculate a heat energy shortage amount which is an amount of heat energy insufficient for raising the temperature of the electrically heated catalyst to a predetermined temperature or above, based on a resistance difference which is a difference between the electric resistance value obtained by the controller and a predetermined reference resistance value; and
   supply to the electrically heated catalyst an amount of energy required to compensate for the heat energy shortage amount calculated by the controller.

2. The exhaust gas purification apparatus for an internal combustion engine according to claim 1, wherein
   the controller supplies heat energy of the heat energy shortage amount to the electrically heated catalyst, by carrying out exhaust gas temperature raising processing, which is processing to raise the temperature of exhaust gas discharged from the internal combustion engine after starting of the internal combustion engine.

3. The exhaust gas purification apparatus for an internal combustion engine according to claim 1, wherein
the controller adds an electrical energization shortage amount, which is electrical energy necessary for the electrically heated catalyst to generate heat energy of the heat energy shortage amount, to an amount of energization of the electrically heated catalyst.

4. The exhaust gas purification apparatus for an internal combustion engine according to claim 3, wherein
the controller adds the electrical energization shortage amount to the amount of energization of the electrically heated catalyst, by making longer a period of time of energization of the electrically heated catalyst.

5. The exhaust gas purification apparatus for an internal combustion engine according to claim 3, wherein
the controller adds the electrical energization shortage amount to the amount of energization of the electrically heated catalyst, by making larger an amount of electrical energization per unit time of the electrically heated catalyst.

6. The exhaust gas purification apparatus for an internal combustion engine according to claim 3, wherein
in cases where a request for starting the internal combustion engine occurs in the middle of adding the electrical energization shortage amount to the amount of energization of the electrically heated catalyst, the controller stops electrical energization to the electrically heated catalyst, and carries out exhaust gas temperature raising processing, which is processing to raise the temperature of exhaust gas discharged from the internal combustion engine after starting of the internal combustion engine.

7. The exhaust gas purification apparatus for an internal combustion engine according to claim 1, wherein
the predetermined period of time is a period of time required for all the condensed water adhered to the electrically heated catalyst to finish evaporating from the start of the energization of the electrically heated catalyst in a state where a maximum amount of condensed water capable of adhering to the electrically heated catalyst has adhered to the electrically heated catalyst.

8. The exhaust gas purification apparatus for an internal combustion engine according to claim 7, wherein
the controller supplies heat energy of the heat energy shortage amount to the electrically heated catalyst, by carrying out exhaust gas temperature raising processing, which is processing to raise the temperature of exhaust gas discharged from the internal combustion engine after starting of the internal combustion engine.

9. The exhaust gas purification apparatus for an internal combustion engine according to claim 7, wherein
the controller adds an electrical energization shortage amount, which is electrical energy necessary for the electrically heated catalyst to generate heat energy of the heat energy shortage amount, to an amount of energization of the electrically heated catalyst.

10. The exhaust gas purification apparatus for an internal combustion engine according to claim 9, wherein
the controller adds the electrical energization shortage amount to the amount of energization of the electrically heated catalyst, by making longer a period of time of energization of the electrically heated catalyst.

11. The exhaust gas purification apparatus for an internal combustion engine according to claim 9, wherein
the controller adds the electrical energization shortage amount to the amount of energization of the electrically heated catalyst, by making larger an amount of electrical energization per unit time of the electrically heated catalyst.

12. The exhaust gas purification apparatus for an internal combustion engine according to claim 9, wherein
in cases where a request for starting the internal combustion engine occurs in the middle of adding the electrical energization shortage amount to the amount of energization of the electrically heated catalyst, the controller stops electrical energization to the electrically heated catalyst, and carries out exhaust gas temperature raising processing, which is processing to raise the temperature of exhaust gas discharged from the internal combustion engine after starting of the internal combustion engine.

13. The exhaust gas purification apparatus for an internal combustion engine according to claim 1, wherein
the predetermined period of time is a period of time from the start of the energization of the electrically heated catalyst until an amount of change per unit time of the resistance difference becomes equal to or less than a predetermined threshold value.

14. The exhaust gas purification apparatus for an internal combustion engine according to claim 13, wherein
the controller supplies heat energy of the heat energy shortage amount to the electrically heated catalyst, by carrying out exhaust gas temperature raising processing, which is processing to raise the temperature of exhaust gas discharged from the internal combustion engine after starting of the internal combustion engine.

15. The exhaust gas purification apparatus for an internal combustion engine according to claim 13, wherein
the controller adds an electrical energization shortage amount, which is electrical energy necessary for the electrically heated catalyst to generate heat energy of the heat energy shortage amount, to an amount of energization of the electrically heated catalyst.

16. The exhaust gas purification apparatus for an internal combustion engine according to claim 15, wherein
the controller adds the electrical energization shortage amount to the amount of energization of the electrically heated catalyst, by making longer a period of time of energization of the electrically heated catalyst.

17. The exhaust gas purification apparatus for an internal combustion engine according to claim 15, wherein
the controller adds the electrical energization shortage amount to the amount of energization of the electrically heated catalyst, by making larger an amount of electrical energization per unit time of the electrically heated catalyst.

18. The exhaust gas purification apparatus for an internal combustion engine according to claim 15, wherein
in cases where a request for starting the internal combustion engine occurs in the middle of adding the electrical energization shortage amount to the amount of energization of the electrically heated catalyst, the controller stops electrical energization to the electrically heated catalyst, and carries out exhaust gas temperature raising processing, which is processing to raise the temperature of exhaust gas discharged from the internal combustion engine after starting of the internal combustion engine.

* * * * *